United States Patent
Kyushima et al.

(10) Patent No.: US 8,625,741 B2
(45) Date of Patent: Jan. 7, 2014

(54) SOLID-STATE IMAGE PICKUP DEVICE

(75) Inventors: Ryuji Kyushima, Hamamatsu (JP);
Kazuki Fujita, Hamamatsu (JP);
Junichi Sawada, Hamamatsu (JP)

(73) Assignee: Hamamatsu Photonics K.K.,
Hamamatsu-shi, Shizuoka (JP)

( * ) Notice: Subject to any disclaimer, the term of this patent is extended or adjusted under 35 U.S.C. 154(b) by 332 days.

(21) Appl. No.: 13/054,298

(22) PCT Filed: Jul. 13, 2009

(86) PCT No.: PCT/JP2009/062666
§ 371 (c)(1),
(2), (4) Date: Mar. 31, 2011

(87) PCT Pub. No.: WO2010/007962
PCT Pub. Date: Jan. 21, 2010

(65) Prior Publication Data
US 2011/0176656 A1    Jul. 21, 2011

(30) Foreign Application Priority Data

Jul. 17, 2008   (JP) ................................ 2008-186350

(51) Int. Cl.
*H05G 1/64*   (2006.01)
(52) U.S. Cl.
USPC ....................................................... 378/98.8
(58) Field of Classification Search
USPC ......... 378/19, 98.8, 207; 250/370.08, 370.09; 348/294–324
See application file for complete search history.

(56) References Cited

U.S. PATENT DOCUMENTS 6,118,846 A   9/2000  Liu
6,396,539 B1  5/2002  Heller et al.
(Continued)

FOREIGN PATENT DOCUMENTS

CN   1906925      1/2007
DE   198 60 036   3/2000
(Continued)

OTHER PUBLICATIONS

U.S. Office Action dated Jul. 17, 2012 that issued in U.S. Appl. No. 12/864,134 including Double Patenting Rejections on pp. 3-7.

(Continued)

*Primary Examiner* — Courtney Thomas
(74) *Attorney, Agent, or Firm* — Drinker Biddle & Reath LLP

(57) ABSTRACT

A solid-state image pickup device 1 includes a photodetecting section 10, a signal readout section 20, a controlling section 30, and a correction processing section 40. In the photodetecting section 10, M×N pixel units $P_{1,1}$ to $P_{M,N}$ each including a photodiode that generates charge of an amount according to an incident light intensity and a readout switch connected to the photodiode are two-dimensionally arrayed in M rows and N columns. A charge generated in each pixel unit $P_{m,n}$ is input to an integration circuit $S_n$ through a readout wiring line $L_{O,n}$, and a voltage value output from the integration circuit $S_n$ according to the charge amount is output to an output wiring line $L_{out}$ through a holding circuit $H_n$. In the correction processing section 40, a correction processing is applied to respective frame data output from the signal readout section 20, and the frame data after the correction processing is output. Accordingly, a solid-state image pickup device that allows acquiring a high-resolution image by correcting pixel data when any readout wiring line is disconnected is realized.

9 Claims, 8 Drawing Sheets

(56) References Cited

U.S. PATENT DOCUMENTS

| | | |
|---|---|---|
| 6,792,159 B1 | 9/2004 | Aufrichtig et al. |
| 6,961,088 B2 | 11/2005 | Kameshima et al. |
| 6,995,373 B2 | 2/2006 | Ishii et al. |
| 7,106,371 B1 | 9/2006 | Kubo et al. |
| 7,796,172 B1 | 9/2010 | Slagle et al. |
| 8,159,576 B2 | 4/2012 | Fujita et al. |
| 8,189,084 B2 | 5/2012 | Kyushima et al. |
| 2002/0085109 A1 | 7/2002 | Nakamura et al. |
| 2002/0105579 A1 | 8/2002 | Levine et al. |
| 2002/0122123 A1 | 9/2002 | Kimura |
| 2002/0167601 A1 | 11/2002 | Ohzu et al. |
| 2003/0179125 A1 | 9/2003 | Fujita et al. |
| 2005/0063513 A1 | 3/2005 | Hsieh et al. |
| 2005/0145903 A1 | 7/2005 | Ishii et al. |
| 2006/0104417 A1 | 5/2006 | Kameshima et al. |
| 2007/0096032 A1 | 5/2007 | Yagi et al. |
| 2007/0252904 A1 | 11/2007 | Rosen |
| 2009/0295954 A1 | 12/2009 | Mori et al. |
| 2010/0194937 A1 | 8/2010 | Kyushima et al. |
| 2010/0208113 A1 | 8/2010 | Kyushima et al. |
| 2010/0245646 A1 | 9/2010 | Fujita et al. |
| 2010/0295982 A1 | 11/2010 | Kyushima et al. |

FOREIGN PATENT DOCUMENTS

| | | |
|---|---|---|
| DE | 102 13 564 | 10/2003 |
| EP | 0 986 249 | 3/2000 |
| JP | 2000-46645 | 2/2000 |
| JP | 2000-324401 | 11/2000 |
| JP | 2001-251557 | 9/2001 |
| JP | 2003-296722 | 10/2003 |
| JP | 2004-521721 | 7/2004 |
| JP | 2005-210164 | 8/2005 |
| JP | 2006-211069 | 8/2006 |
| JP | 2006-234557 | 9/2006 |
| JP | 2007-174124 | 7/2007 |
| JP | 2008-252691 | 10/2008 |
| TW | 200731522 | 8/2007 |
| WO | WO 00/50879 | 8/2000 |
| WO | WO 2009/031585 | 3/2009 |

OTHER PUBLICATIONS

Statement of Substance of Examiner Interview filed on Apr. 1, 2013 in U.S. Appl. No. 12/864,134 including a Discussion of Possible Double Patenting Rejections at pp. 1-2.

SOLID-STATE IMAGE PICKUP DEVICE

TECHNICAL FIELD

The present invention relates to a solid-state image pickup device.

BACKGROUND ART

As solid-state image pickup devices, devices using CMOS technology are known, and among these, a passive pixel sensor (PPS) type device is known (refer to Patent Document 1). The PPS type solid-state image pickup device, for which PPS type pixel units including photodiodes for generating charges of amounts according to incident light intensities are two-dimensionally arrayed in M rows and N columns, accumulates charges generated in the photodiode in response to light incidence in each pixel unit in a capacitive element of an integration circuit, and outputs a voltage value according to the accumulated charge amount.

Generally, an output terminal of each of the M pixel units of each column is connected to an input terminal of an integration circuit provided corresponding to the column via a readout wiring line provided corresponding to the column. Further, in sequence from the first row to the M-th row and row by row, a charge generated in the photodiode of the pixel unit is input to a corresponding integration circuit through a corresponding readout wiring line, and a voltage value according to the charge amount is output from the integration circuit.

The PPS type solid-state image pickup device is used for various purposes, and for example, used in combination with a scintillator panel as an X-ray flat panel for medical purposes and industrial purposes, and still more specifically, the device is also used in an X-ray CT apparatus, a microfocus X-ray inspection apparatus, and the like. The solid-state image pickup device to be used for these purposes has a large area of a photodetecting section in which M×N pixel units are two-dimensionally arrayed, and may be integrated on a semiconductor substrate having a size with sides more than 10 cm in length. Therefore, only one solid-state image pickup device may be produced from one semiconductor wafer.

CITATION LIST

Patent Literature

Patent Document 1: Japanese Patent Application Laid-Open No. 2006-234557

SUMMARY OF INVENTION

Technical Problem

In the above-described solid-state image pickup device, when a readout wiring line corresponding to any of the columns is disconnected during production, pixel units closer to the integration circuit than the disconnected point among the M pixel units of the column are connected to the integration circuit by the readout wiring line, while pixel units farther from the integration circuit than the disconnected point are not connected to the integration circuit. Therefore, charges generated in photodiodes in response to light incidence in the pixel units farther from the integration circuit than the disconnected point are not read out to the integration circuit, and are just accumulated in junction capacitance sections of the photodiodes.

When the amount of charges accumulated in the junction capacitance sections of the photodiodes exceeds a saturation level, a surplus of charges over the saturation level overflows to the neighboring pixel units. Therefore, when one readout wiring line is disconnected, this influences not only the pixel units of the column connected to the readout wiring line but also pixel units of neighboring columns on both sides of the column in question, and eventually, defective lines occur with pixel units of three consecutive columns.

When defective lines are not consecutive and the neighboring lines of one defective line are normal, pixel data of the defective line can be interpolated by using pixel data of the neighboring normal lines. However, when defective lines occur with pixel units of three consecutive columns, the above-described interpolation is difficult. Particularly, in the solid-state image pickup device having a large-area photodetecting section as described above, the probability of disconnection occurring is greater due to long lengths of the readout wiring lines.

There has been proposed in Patent Document 1 an invention with the intention of eliminating such problems. In this invention, not only obtained is an average value of all pixel data of a neighboring line neighboring the defective line, but obtained also is an average value of all pixel data of a few further neighboring normal lines, and it is determined that the neighboring line is also defective if a difference between these two average values is not less than a predetermined value, the pixel data of the neighboring line is corrected, and further pixel data of the defective line is corrected based on a value after correction of the pixel data of the neighboring line.

In the invention described in Patent Document 1, when correcting the pixel data of the neighboring line determined to be defective, an average value of two pieces of pixel data on the nearest normal lines on both sides of the neighboring line is obtained, and the average value is set as pixel data of the neighboring line. Moreover, when correcting the pixel data of the defective line, an average value of two pieces of pixel data on the neighboring lines on both sides of the defective line is obtained, and the average value is set as pixel data of the defective line.

However, in the invention described in Patent Document 1, since the process of obtaining an average of two pieces of pixel data is to be repeated a plurality of times in order to correct pixel data of a defective line (and a line determined to be defective in the vicinity of the defective line), an image after correction has a low resolution in the vicinity of the defective line.

The present invention has been made in order to solve the above-described problems, and an object thereof is to provide a solid-state image pickup device that can acquire a high-resolution image by correcting pixel data when any readout wiring line is disconnected.

Solution to Problem

A solid-state image pickup device according to the present invention includes (1) a photodetecting section where M×N pixel units $P_{1,1}$ to $P_{M,N}$ each including a photodiode that generates charge of an amount according to an incident light intensity and a readout switch connected with the photodiode are two-dimensionally arrayed in M rows and N columns, (2) a readout wiring line $L_{O,n}$ connected to the readout switch of each of the M pixel units $P_{1,n}$ to $P_{M,n}$ of an n-th column in the photodetecting section, for reading out a charge generated in the photodiode of any pixel unit of the M pixel units $P_{1,n}$ to $P_{M,n}$ via the readout switch of the pixel unit, (3) a signal readout section connected to each of the readout wiring lines $L_{O,1}$ to $L_{O,N}$, for holding a voltage value according to an amount of charge input through the readout wiring line $L_{O,n}$, and sequentially outputting the held voltage values, and (4) a controlling section that controls an opening and closing operation of the readout switch of each of the N pixel units $P_{m,1}$ to $P_{m,N}$ of an m-th row in the photodetecting section and controls an outputting operation of a voltage value in the signal readout section to make a voltage value V(m,n) according to an amount of charge generated in the photodiode of each pixel unit $P_{m,n}$ in the photodetecting section be output as frame data from the signal readout section. Here, M and N are each an integer not less than 2, m is an integer not less than 1 and not more than M, and n is an integer not less than 1 and not more than N.

The solid-state image pickup device according to the present invention further includes a correction processing section that acquires respective frame data output from the signal readout section to apply thereto correction processing, in addition to the above-described photodetecting section, readout wiring line $L_{O,n}$, signal readout section, and controlling section. Moreover, a frame data correcting method according to the present invention is a method for correcting frame data output from a solid-state image pickup device including the above-described photodetecting section, readout wiring line $L_{O,n}$, signal readout section, and controlling section.

The correction processing section included in the solid-state image pickup device according to the present invention or the frame data correcting method according to the present invention comprises, when m0 pixel units $P_{1,n0}$ to $P_{m0,n0}$ of any n0-th column are not connected to the signal readout section due to a disconnection of the n0-th column readout wiring line $L_{O,n0}$ of the readout wiring lines $L_{O,1}$ to $L_{O,N}$, by use of a coefficient K indicating the degree of influence that generation of charge in the photodiode of each of the m0 pixel units $P_{1,n0}$ to $P_{m0,n0}$ of the n0-th column has on m0 pixel units $P_{1,n1}$ to $P_{m0,n1}$ of an n1-th column neighboring the n0-th column, performing correction processing for correcting, out of the respective frame data output from the signal readout section, voltage values V(1, n1) to V(m0, n1) corresponding to the m0 pixel units $P_{1,n1}$ to $P_{m0,n1}$ of the n1-th column according to the following equation (1) (equation (1a) and equation (1b)), taking a column not being either the n0-th column or the n1-th column as an n2-th column, and performing determination processing for determining, based on corrected voltage values $V_c(1, n1)$ to $V_c(m0, n1)$ of these voltage values, voltage values V(1, n0) to V(m0, n0) corresponding to the m0 pixel units $P_{1,n0}$ to $P_{m0,n0}$ of the n0-th column. Here, m0 is an integer not less than 1 and not more than M, and n0, n1, and n2 are each an integer not less than 1 and not more than N.

[Equation 1]

$$Y = \sum_{m=1}^{m0} (V(m, n1) - V(m, n2))/m0 \quad (1a)$$

$$V_c(m, n1) = V(m, n1) - KY \quad (m = 1 \sim m0) \quad (1b)$$

In the present invention, it is supposed that any readout wiring line $L_{O,n0}$ of the n0-th column of the readout wiring lines $L_{O,1}$ to $L_{O,N}$ is disconnected, and m0 pixel units $P_{1,n0}$ to $P_{m0,n0}$ of the n0-th column are not connected to the signal readout section due to this disconnection. At this time, out of the respective frame data output from the signal readout section, to voltage values V(1, n1) to V(m0, n1) corresponding to the m0 pixel units $P_{1,n1}$ to $P_{m0,n1}$ of the n1-th column being a neighboring line, correction processing is applied according to the above equation (1). Moreover, to voltage values V(1, n0) to V(m0, n0) corresponding to the m0 pixel units $P_{1,n0}$ to $P_{m0,n0}$ of the n0-th column being a defective line, determination processing is applied based on corrected voltage values $V_c(1, n1)$ to $V_c(m0, n1)$ corresponding to the m0 pixel units $P_{1,n1}$ to $P_{m0,n1}$ of the n1-th column being a neighboring line. The coefficient K to be used in the above-described correction processing indicates the degree of influence that generation of charge in the photodiode of each of the m0 pixel units $P_{1,n0}$ to $P_{m0,n0}$ of the n0-th column has on the m0 pixel units $P_{1,n1}$ to $P_{m0,n1}$ of the n1-th column neighboring the n0-th column.

Moreover, an X-ray CT apparatus according to the present invention includes (1) an X-ray output section that outputs X-rays toward a subject, (2) the above-described solid-state image pickup device according to the present invention that receives and images X-rays having been output from the X-ray output section and reached through the subject, (3) a moving unit that moves the X-ray output section and the solid-state image pickup device relative to the subject, and (4) an image analyzing section that is input with frame data after the correction processing output from the solid-state image pickup device, and generates a tomographic image of the subject based on the frame data.

Advantageous Effects of Invention

According to the present invention, a high-resolution image can be obtained by correcting pixel data when any readout wiring line is disconnected.

DESCRIPTION OF EMBODIMENTS

Hereinafter, embodiments of the present invention will be described in detail with reference to the accompanying drawings. Also, the same components will be denoted with the same reference symbols in the description of the drawings, and overlapping description will be omitted.

Figure 1:
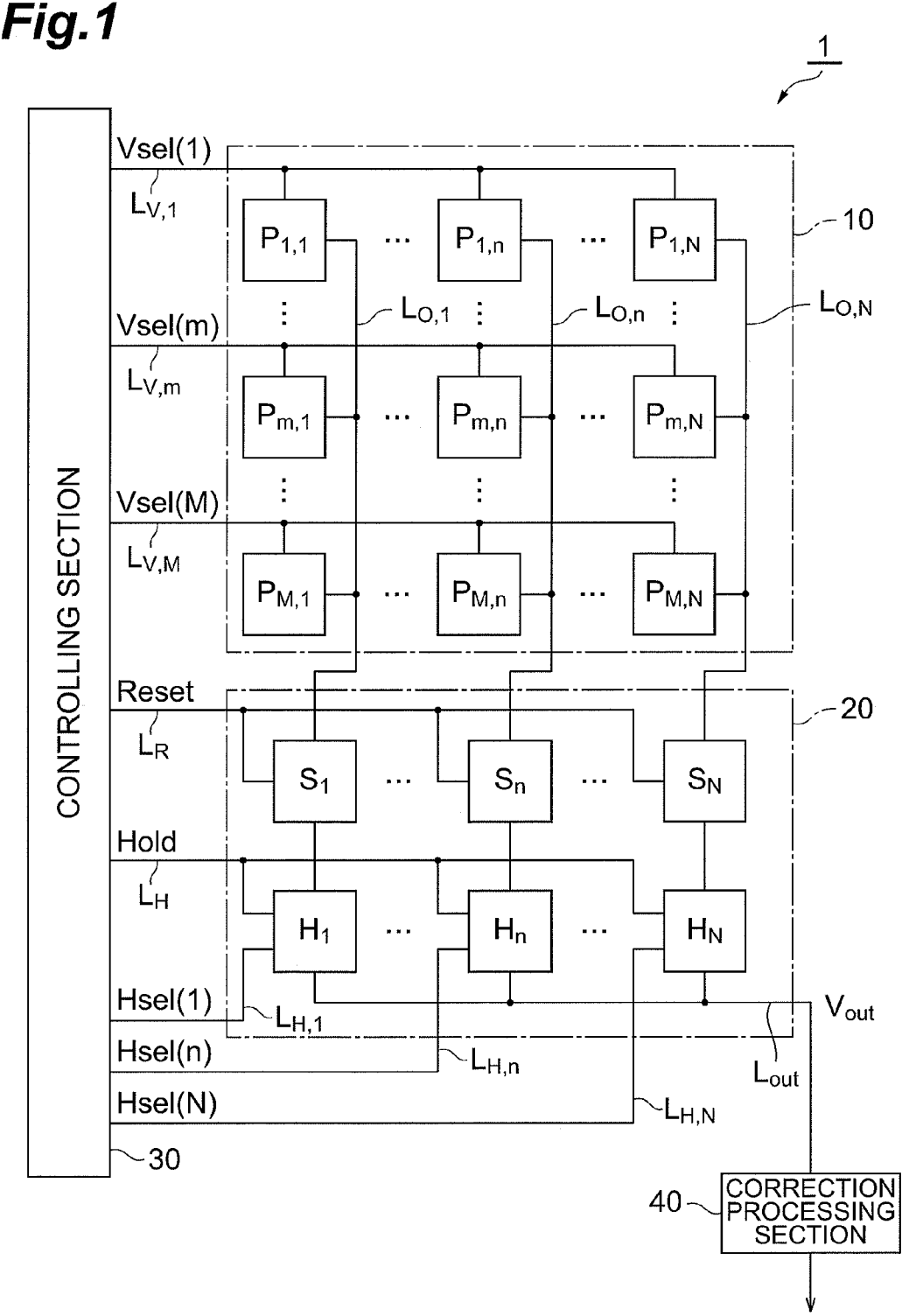
FIG. 1 is a schematic configuration diagram of a solid-state image pickup device 1 according to the present embodiment.

FIG. 1 is a schematic configuration diagram of a solid-state image pickup device 1 according to the present embodiment. The solid-state image pickup device 1 of the present embodiment includes a photodetecting section 10, a signal readout section 20, a controlling section 30, and a correction processing section 40. Moreover, in the case of usage as an X-ray flat panel, a scintillator panel is overlaid on the photodetecting surface 10 of the solid-state image pickup device 1.

The photodetecting section 10 is a section where M×N pixel units $P_{1,1}$ to $P_{M,N}$ are two-dimensionally arrayed in M rows and N columns. A pixel unit $P_{m,n}$ is located on the m-th row and the n-th column. Here, M and N are integers not less than 2, respectively, m is an integer not less than 1 and not more than M, and n is an integer not less than 1 and not more than N. The respective pixel units $P_{m,n}$ are of the PPS type, and have a common configuration.

Each of the N pixel units $P_{m,1}$ to $P_{m,N}$ of the m-th row is connected to the controlling section 30 by an m-th row selection wiring line $L_{V,m}$. An output terminal of each of the M pixel units $P_{1,n}$ to $P_{M,n}$ of the n-th column is connected to an integration circuit $S_n$ included in the signal readout section 20 by an n-th column readout wiring line $L_{O,n}$.

The signal readout section 20 includes N integration circuits $S_1$ to $S_N$ and N holding circuits $H_1$ to $H_N$. The respective integration circuits $S_n$ have a common configuration. Moreover, the respective holding circuits $H_n$ have a common configuration.

Each integration circuit $S_n$ has an input terminal connected to the readout wiring line $L_{O,n}$, accumulates charges input to this input terminal, and outputs a voltage value according to the accumulated charge amount from an output terminal to the holding circuit $H_n$. Each of the N integration circuits $S_1$ to $S_N$ is connected to the controlling section 30 by a discharge wiring line $L_R$.

Each holding circuit $H_n$ has an input terminal connected to the output terminal of the integration circuit $S_n$, holds a voltage value input to this input terminal, and outputs the held voltage value from an output terminal to an output wiring line $L_{out}$. Each of the N holding circuits $H_1$ to $H_N$ is connected to the controlling section 30 by a hold wiring line $L_H$. Moreover, each holding circuit $H_n$ is connected to the controlling section 30 by an n-th column selection wiring line $L_{H,n}$.

The controlling section 30 outputs an m-th row selection control signal Vsel(m) to the m-th row selection wiring line $L_{V,m}$ to supply this m-th row selection control signal Vsel(m) to each of the N pixel units $P_{m,1}$ to $P_{m,N}$ of the m-th row. M row selection control signals Vsel(1) to Vsel(M) are made to sequentially take significant values. The controlling section 30 includes a shift register to sequentially output the M row selection control signals Vsel(1) to Vsel(M) as significant values.

The controlling section 30 outputs an n-th column selection control signal Hsel(n) to the n-th column selection wiring line $L_{H,n}$ to supply this n-th column selection control signal Hsel(n) to the holding circuit $H_n$. N column selection control signals Hsel(1) to Hsel(N) are also made to sequentially take significant values. The controlling section 30 includes a shift register to sequentially output the N column selection control signals Hsel(1) to Hsel(N) as significant values.

Moreover, the controlling section 30 outputs a discharge control signal Reset to the discharge wiring line $L_R$ to supply this discharge control signal Reset to each of the N integration circuits $S_1$ to $S_N$. The controlling section 30 outputs a hold control signal Hold to the hold wiring line $L_H$ to supply this hold control signal Hold to each of the N holding circuits $H_1$ to $H_N$.

The controlling section 30, as in the above, controls an opening and closing operation of a readout switch $SW_1$ included in each of the N pixel units $P_{m,1}$ to $P_{m,N}$ of the m-th row in the photodetecting section 10, and controls a holding operation and an outputting operation of a voltage value in the signal readout section 20. Accordingly, the controlling section 30 makes a voltage value according to the amount of charge generated in the photodiode PD included in each of the M×N pixel units $P_{1,1}$ to $P_{M,N}$ in the photodetecting section 10 be repeatedly output as frame data from the signal readout section 20.

The correction processing section 40 acquires the respective frame data repeatedly output from the signal readout section 20 to apply thereto correction processing, and outputs the frame data after the correction processing. The content of the correction processing in the correction processing section 40 will be described later in detail.

Figure 2:
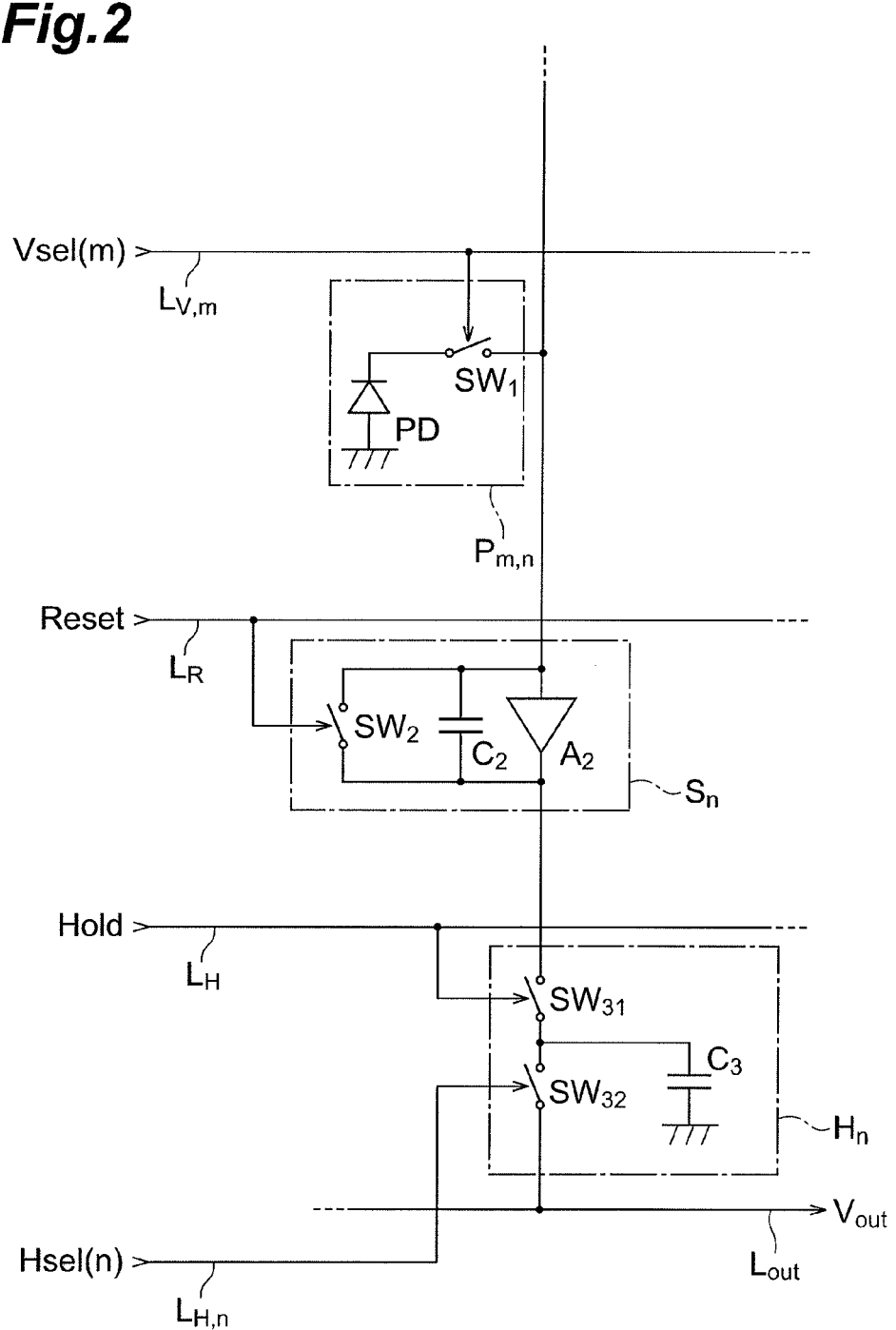
FIG. 2 is a circuit diagram of each of the pixel unit $P_{m,n}$ included in the solid-state image pickup device 1 according to the present embodiment, the integration circuit $S_n$, and the holding circuit $H_n$.

FIG. 2 is a circuit diagram of each of the pixel unit $P_{m,n}$ included in the solid-state image pickup device 1 according to the present embodiment, the integration circuit $S_n$, and the holding circuit $H_n$. Here, a circuit diagram of the pixel unit $P_{m,n}$ is shown as a representative of the M×N pixel units $P_{1,1}$ to $P_{M,N}$, a circuit diagram of the integration circuit $S_n$ is shown as a representative of the N integration circuits $S_1$ to $S_N$, and a circuit diagram of the holding circuit $H_n$ is shown as a representative of the N holding circuits $H_1$ to $H_N$. That is, a circuit portion relating to the pixel unit $P_{m,n}$ on the m-th row and the n-th column and the n-th column readout wiring line $L_{O,n}$ is shown.

The pixel unit $P_{m,n}$ includes a photodiode PD and a readout switch $SW_1$. An anode terminal of the photodiode PD is grounded, and a cathode terminal of the photodiode PD is connected to the n-th column readout wiring line $L_{O,n}$ via the readout switch $SW_1$. The photodiode PD generates charge of an amount according to an incident light intensity, and accumulates the generated charge in a junction capacitance section. The readout switch $SW_1$ is supplied with the m-th row selection control signal passed through the m-th row selection wiring line $L_{V,m}$ from the controlling section 30. The m-th row selection control signal is a signal that instructs an opening and closing operation of the readout switch $SW_1$ included in each of the N pixel units $P_{m,1}$ to $P_{m,N}$ of the m-th row in the photodetecting section 10.

In the pixel unit $P_{m,n}$, when the m-th row selection control signal Vsel(m) is at low level, the readout switch $SW_1$ opens, and a charge generated in the photodiode PD is not output to the n-th column readout wiring line $L_{O,n}$ but is accumulated in the junction capacitance section. On the other hand, when the m-th row selection control signal Vsel(m) is at high level, the readout switch $SW_1$ closes, and the charge generated in the photodiode PD and accumulated in the junction capacitance section until then is output to the n-th column readout wiring line $L_{O,n}$ through the readout switch $SW_1$.

The n-th column readout wiring line $L_{O,n}$ is connected with the readout switch $SW_1$ included in each of the M pixel units $P_{1,n}$ to $P_{M,n}$ of the n-th column in the photodetecting section 10. The n-th column readout wiring line $L_{O,n}$ reads out a charge generated in the photodiode PD included in any pixel unit of the M pixel units $P_{1,n}$ to $P_{M,n}$ via the readout switch $SW_1$ included in the pixel unit, and transfers the charge to the integration circuit $S_n$.

The integration circuit $S_n$ includes an amplifier $A_2$, an integrating capacitive element $C_2$, and a discharge switch $SW_2$. The integrating capacitive element $C_2$ and the discharge switch $SW_2$ are connected in parallel to each other, and provided between an input terminal and an output terminal of the amplifier $A_2$. The input terminal of the amplifier $A_2$ is connected to the n-th column readout wiring line $L_{O,n}$. The discharge switch $SW_2$ is supplied with the discharge control signal Reset passed through the discharge wiring line $L_R$ from the controlling section 30. The discharge control signal Reset is a signal that instructs an opening and closing operation of the discharge switch $SW_2$ included in each of the N integration circuits $S_1$ to $S_N$.

In the integration circuit $S_n$, when the discharge control signal Reset is at high level, the discharge switch $SW_2$ closes, the integrating capacitive element $C_2$ is discharged, and a voltage value to be output from the integration circuit $S_n$ is initialized. When the discharge control signal Reset is at low level, the discharge switch $SW_2$ opens, a charge input to the input terminal is accumulated in the integrating capacitive element $C_2$, and a voltage value according to the accumulated charge amount is output from the integration circuit $S_n$.

The holding circuit $H_n$ includes an input switch $SW_{31}$, an output switch $SW_{32}$, and a holding capacitive element $C_3$. One end of the holding capacitive element $C_3$ is grounded. The other end of the holding capacitive element $C_3$ is connected to the output terminal of the integration circuit $S_n$ via the input switch $SW_{31}$, and connected to the voltage output wiring line $L_{out}$ via the output switch $SW_{32}$. The input switch $SW_{31}$ is supplied with the hold control signal Hold passed through the hold wiring line $L_H$ from the controlling section 30. The hold control signal Hold is a signal that instructs an opening and closing operation of the input switch $SW_{31}$ included in each of the N holding circuits $H_1$ to $H_N$. The output switch $SW_{32}$ is supplied with the n-th column selection control signal Hsel(n) passed through the n-th column selection wiring line $L_{H,n}$ from the controlling section 30. The n-th column selection control signal Hsel(n) is a signal that instructs an opening and closing operation of the output switch $SW_{32}$ included in the holding circuit $H_n$.

In the holding circuit $H_n$, when the hold control signal Hold switches from high level to low level, the input switch $SW_{31}$ switches from a closed state to an open state, and a voltage value being input to the input terminal at this time is held in the holding capacitive element $C_3$. Moreover, when the n-th column selection control signal Hsel(n) is at high level, the output switch $SW_{32}$ closes, and the voltage value held in the holding capacitive element $C_3$ is output to the voltage output wiring line $L_{out}$.

The controlling section 30, when outputting a voltage value according to a detected light intensity in each of the N pixel units $P_{m,1}$ to $P_{m,N}$ of the m-th row in the photodetecting section 10, instructs temporary closing and then opening of the discharge switch $SW_2$ included in each of the N integration circuits $S_1$ to $S_N$ by the discharge control signal Reset, and then instructs closing of the readout switch $SW_1$ included in each of the N pixel units $P_{m,1}$ to $P_{m,N}$ of the m-th row in the photodetecting section 10 for a predetermined period by the m-th row selection control signal Vsel(m). The controlling section 30, in this predetermined period, instructs switching of the input switch $SW_{31}$ included in each of the N holding circuits $H_1$ to $H_N$ from a closed state to an open state by the hold control signal Hold. Then, the controlling section 30, after the predetermined period, instructs sequential closing of the output switches $SW_{32}$ included in the respective N holding circuits $H_1$ to $H_N$ for a predetermined period by column selection control signals Hsel(1) to Hsel(N). The controlling section 30 performs such control as in the above for the respective rows in sequence.

Next, operation of the solid-state image pickup device 1 according to the present embodiment will be described. In the solid-state image pickup device 1 according to the present embodiment, as a result of level changes of each of the M row selection control signals Vsel(1) to Vsel(M), the N column selection control signals Hsel(1) to Hsel(N), the discharge control signal Reset, and the hold control signal Hold at predetermined timings under control by the controlling section 30, a light image made incident on the photodetecting surface 10 can be imaged to obtain frame data, and further, the frame data can be corrected by the correction processing section 40.

Figure 3:
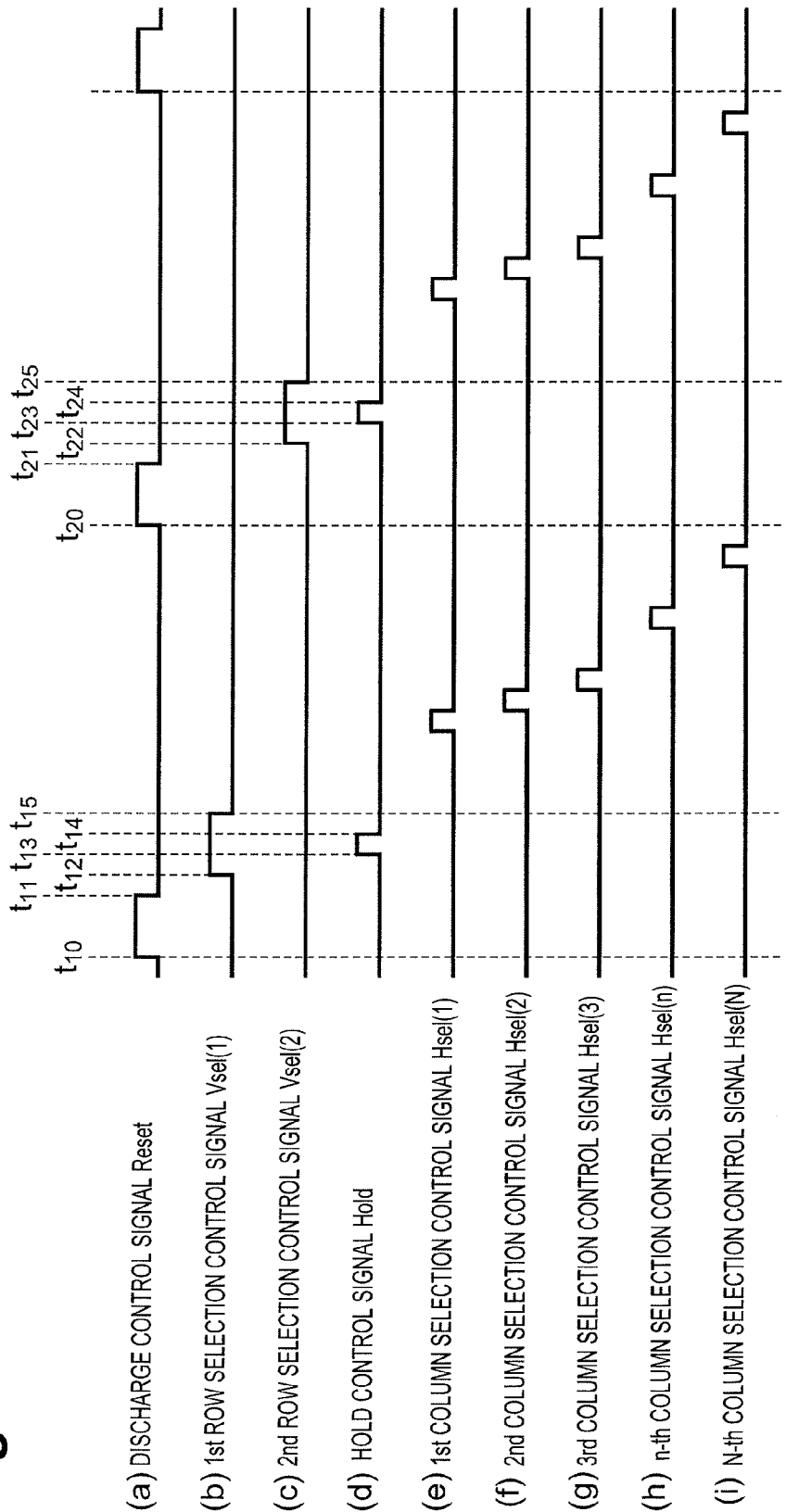
FIG. 3 is a timing chart for explaining operation of the solid-state image pickup device 1 according to the present embodiment.

FIG. 3 is a timing chart for explaining operation of the solid-state image pickup device 1 according to the present embodiment. This figure shows, in order from the top, (a) the discharge control signal Reset for instructing an opening and closing operation of the discharge switch $SW_2$ included in each of the N integration circuits $S_1$ to $S_N$, (b) the first row selection control signal Vsel(1) for instructing an opening and closing operation of the readout switch $SW_1$ included in each of the N pixel units $P_{1,1}$ to $P_{1,N}$ of the first row in the photodetecting section 10, (c) the second row selection control signal Vsel(2) for instructing an opening and closing operation of the readout switch $SW_1$ included in each of the N pixel units $P_{2,1}$ to $P_{2,N}$ of the second row in the photodetecting section 10, and (d) the hold control signal Hold for instructing an opening and closing operation of the input switch $SW_{31}$ included in each of the N holding circuits $H_1$ to $H_N$.

Moreover, this figure further goes on to show, in order, (e) the first column selection control signal Hsel(1) for instructing an opening and closing operation of the output switch $SW_{32}$ included in the holding circuit $H_1$, (f) the second column selection control signal Hsel(2) for instructing an opening and closing operation of the output switch $SW_{32}$ included in the holding circuit $H_2$, (g) the third column selection control signal Hsel(3) for instructing an opening and closing operation of the output switch $SW_{32}$ included in the holding circuit $H_3$, (h) the n-th column selection control signal Hsel(n) for instructing an opening and closing operation of the output switch $SW_{32}$ included in the holding circuit $H_n$, and (i) the N-th column selection control signal Hsel(N) for instructing an opening and closing operation of the output switch $SW_{32}$ included in the holding circuit $H_N$.

A charge generated in the photodiode PD included in each of the N pixel units $P_{1,1}$ to $P_{1,N}$ of the first row and accumulated in the junction capacitance section is read out as follows. Before the time $t_{10}$, the M row selection control signals Vsel(1) to Vsel(M), the N column selection control signals Hsel(1) to Hsel(N), the discharge control signal Reset, and the hold control signal Hold have been made at low level.

During a period from the time $t_{10}$ to the time $t_{11}$, the discharge control signal Reset to be output from the controlling section 30 to the discharge wiring line $L_R$ becomes high level, and accordingly, in each of the N integration circuits $S_1$ to $S_N$, the discharge switch $SW_2$ closes, and the integrating capacitive element $C_2$ is discharged. Moreover, during a period from the time $t_{12}$ to the time $t_{15}$ after the time $t_{11}$, the first row selection control signal Vsel(1) to be output from the controlling section 30 to the first row selection wiring line $L_{V,1}$ becomes high level, and accordingly, the readout switch $SW_1$ included in each of the N pixel units $P_{1,1}$ to $P_{1,N}$ of the first row in the photodetecting section 10 closes.

In this period ($t_{12}$ to $t_{15}$), during a period from the time $t_{13}$ to the time $t_{14}$, the hold control signal Hold to be output from the controlling section 30 to the hold wiring line $L_H$ becomes high level, and accordingly, the input switch $SW_{31}$ closes in each of the N holding circuits $H_1$ to $H_N$.

In the period ($t_{12}$ to $t_{15}$), the readout switch $SW_1$ included in each pixel unit $P_{1,n}$ of the first row is closed, and the discharge switch $SW_2$ of each integration circuit $S_n$ is open, and therefore, a charge generated in the photodiode PD of each pixel unit $P_{1,n}$ and accumulated in the junction capacitance section until then is transferred to and accumulated in the integrating capacitive element $C_2$ of the integration circuit $S_n$ through the readout switch $SW_1$ of the pixel unit $P_{1,n}$ and the n-th column readout wiring line $L_{O,n}$. Then, a voltage value according to the amount of charge accumulated in the integrating capacitive element $C_2$ of each integration circuit $S_n$ is output from the output terminal of the integration circuit $S_n$.

At the time $t_{14}$ in the period ($t_{12}$ to $t_{15}$), as a result of the hold control signal Hold switching from high level to low level, in each of the N holding circuits $H_1$ to $H_N$, the input switch $SW_{31}$ switches from a closed state to an open state, and a voltage value being output from the output terminal of the integration circuit $S_n$ and being input to the input terminal of the holding circuit $H_n$ at this time is held in the holding capacitive element $C_3$.

Then, after the period ($t_{12}$ to $t_{15}$), the column selection control signals Hsel(1) to Hsel(N) to be output from the controlling section 30 to the column selection wiring lines $L_{H,1}$ to $L_{H,N}$ sequentially become high level for a predetermined period, and accordingly, the output switches $SW_{32}$ included in the respective N holding circuits $H_1$ to $H_N$ sequentially close for the predetermined period, and the voltage values held in the holding capacitive elements $C_3$ of the respective holding circuits $H_n$ are sequentially output to the voltage output wiring line $L_{out}$ through the output switches $SW_{32}$. The voltage value $V_{out}$ to be output to the voltage output wiring line $L_{out}$ indicates the detected light intensity in the photodiode PD included in each of the N pixel units $P_{1,1}$ to $P_{1,N}$ of the first row. The voltage value $V_{out}$ output to the voltage output wiring line $L_{out}$ from each of the N holding circuits $H_1$ to $H_N$ is input to the correction processing section 40 through the voltage output wiring line $L_{out}$.

Subsequently, a charge generated in the photodiode PD included in each of the N pixel units $P_{2,1}$ to $P_{2,N}$ of the second row and accumulated in the junction capacitance section is read out as follows.

During a period from the time $t_{20}$ to the time $t_{21}$, the discharge control signal Reset to be output from the controlling section 30 to the discharge wiring line $L_R$ becomes high level, and accordingly, in each of the N integration circuits $S_1$ to $S_N$, the discharge switch $SW_2$ closes, and the integrating capacitive element $C_2$ is discharged. Moreover, during a period from the time $t_{22}$ to the time $t_{25}$ after the time $t_{21}$, the second row selection control signal Vsel(2) to be output from the controlling section 30 to the second row selection wiring line $L_{V,2}$ becomes high level, and accordingly, the readout switch $SW_1$ included in each of the N pixel units $P_{2,1}$ to $P_{2,N}$ of the second row in the photodetecting section 10 closes.

In this period ($t_{22}$ to $t_{25}$), during a period from the time $t_{23}$ to the time $t_{24}$, the hold control signal Hold to be output from the controlling section 30 to the hold wiring line $L_H$ becomes high level, and accordingly, the input switch $SW_{31}$ closes in each of the N holding circuits $H_1$ to $H_N$.

Then, after the period ($t_{22}$ to $t_{25}$), the column selection control signals Hsel(1) to Hsel(N) to be output from the controlling section 30 to the column selection wiring lines $L_{H,1}$ to $L_{H,N}$ sequentially become high level for a predetermined period, and accordingly, the output switches $SW_{32}$ included in the respective N holding circuits $H_1$ to $H_N$ sequentially close for the predetermined period.

In such a manner as in the above, a voltage value $V_{out}$ indicating the detected light intensity in the photodiode PD included in each of the N pixel units $P_{2,1}$ to $P_{2,N}$ of the second row is output to the voltage output wiring line $L_{out}$. The voltage value $V_{out}$ output to the voltage output wiring line $L_{out}$ from each of the N holding circuits $H_1$ to $H_N$ is input to the correction processing section 40 through the voltage output wiring line $L_{out}$.

Subsequent to the operation for the first and the second rows as in the above, the same operation is performed for the third to the M-th rows, so that frame data indicating an image acquired in one time of imaging is obtained. Also, when the operation ends with respect to the M-th row, the same operation is again performed in order from the first row, and frame data indicating a next image is obtained. By thus repeating the same operation with a predetermined period, voltage values $V_{out}$ indicating a two-dimensional intensity distribution of an image of light received by the photodetecting section 10 are output to the voltage output wiring line $L_{out}$, and the frame data is repeatedly obtained. These frame data are input to the correction processing section 40.

Meanwhile, in the period during which the readout switch $SW_1$ included in each of the N pixel units $P_{m,1}$ to $P_{m,N}$ of the m-th row is closed, a charge generated in the photodiode PD of each pixel unit $P_{m,n}$ of the m-th row and accumulated in the junction capacitance section is transferred to the integrating capacitive element $C_2$ of the integration circuit $S_n$ through the readout switch $SW_1$ of the pixel unit $P_{m,n}$ and the n-th column readout wiring line $L_{O,n}$. At this time, the accumulated charge in the junction capacitance section of the photodiode PD of each pixel unit $P_{m,n}$ of the m-th row is initialized.

However, when a certain n-th column readout wiring line $L_{O,n}$ is disconnected at a point halfway, among the M pixel units $P_{1,n}$ to $P_{M,n}$ of the n-th column, pixel units farther from the integration circuit $S_n$ than the disconnected point are not connected to the integration circuit $S_n$, and cannot transfer charges to the integration circuit $S_n$, and therefore, initialization of the accumulated charges in the junction capacitance sections of the photodiodes PD by this charge transfer is impossible. If this goes on, charges generated in the photodiodes in response to light incidence in these pixel units are just accumulated in the junction capacitance sections of the photodiodes, and if exceeding the saturation level, the charges overflow to pixel units of neighboring columns and cause defective lines in pixel units of the three consecutive columns.

Therefore, in the solid-state image pickup device 1 according to the present embodiment, the correction processing section 40 acquires respective frame data repeatedly output from the signal readout section 20, and applies the following correction processing to the frame data.

In the following, it is supposed that any n0-th column readout wiring line $L_{O,n0}$ of the readout wiring lines $L_{O,1}$ to $L_{O,N}$ is disconnected, and m0 pixel units $P_{1,n0}$ to $P_{m0,n0}$ of the n0-th column are not connected to the integration circuit $S_{n0}$ of the signal readout section 20 due to this n0-th column readout wiring line $L_{O,n0}$. A column neighboring this n0-th column (defective line) is provided as an n1-th column (neighboring line), and a column not being either the n0-th column (defective line) or the n1-th column (neighboring line) is provided as an n2-th column (normal line). Here, a column neighboring the n1-th column (neighboring line) is provided as the n2-th column (normal line). Here, m0 is an integer not less than 1 and not more than M, and n0, n1, and n2 are each an integer not less than 1 and not more than N.

Figure 4:
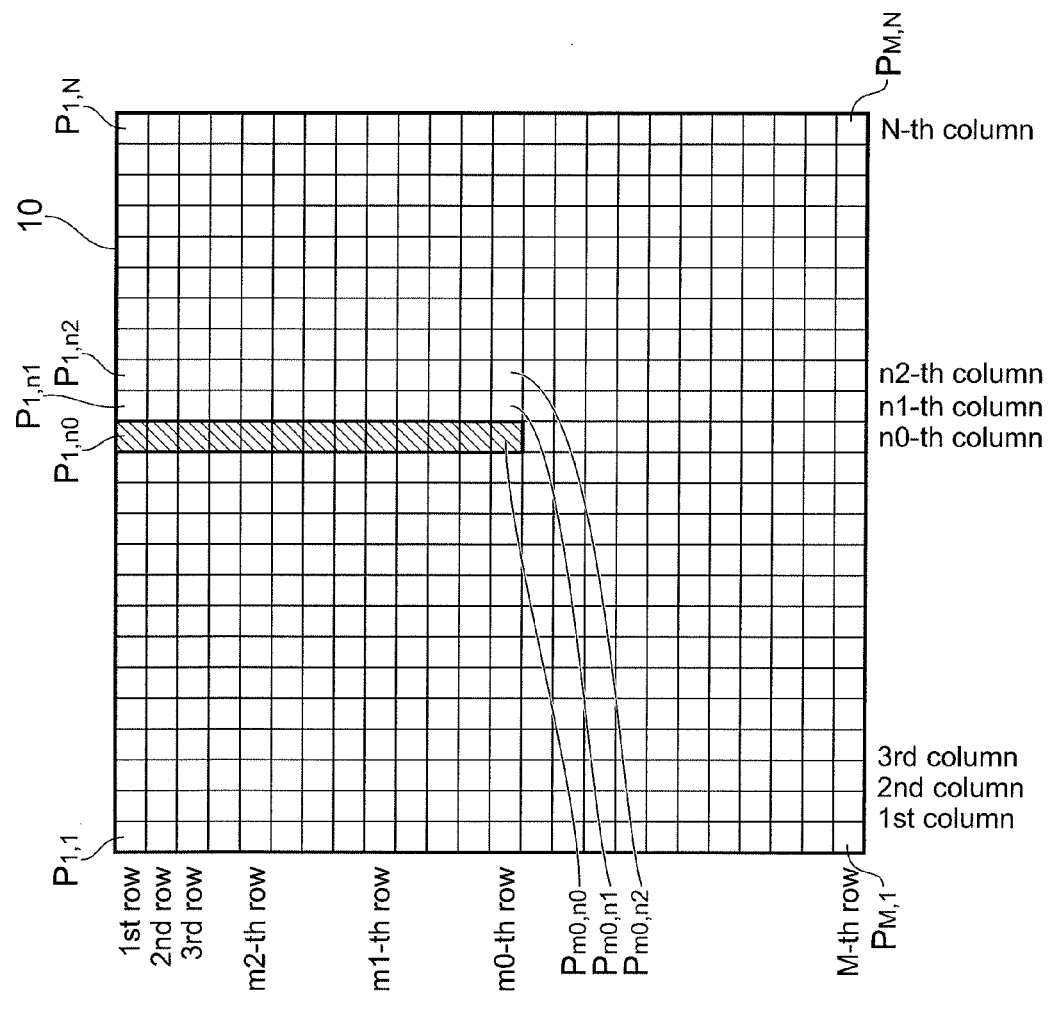
FIG. 4 is a diagram showing an arrangement of respective pixel units $P_{m,n}$ in a photodetecting section 10 of the solid-state image pickup device 1 according to the present embodiment.

FIG. 4 is a diagram showing an arrangement of respective pixel units $P_{m,n}$ in the photodetecting section 10 of the solid-state image pickup device 1 according to the present embodiment. In this figure, the m0 pixel units $P_{1,n0}$ to $P_{m0,n0}$ of the n0-th column being a defective line are shown by hatching.

Moreover, a voltage value corresponding to the pixel unit $P_{m,n}$ out of the frame data to be output from the signal readout section 20 is expressed as V(m,n). Here, it is preferable that each voltage value V(m, n) is a value (that is, a value after a dark correction) from which a voltage value (dark current component) to be output from the signal readout section 20 with no light made incident on the pixel unit $P_{m,n}$ has been subtracted. For thus subtracting a dark current component, it suffices to provide a pair of holding circuits $H_n$ column by column, hold a signal voltage value superimposed with a dark current component by one holding circuit, hold only a dark current component by the other holding circuit, and calculate a difference between the two voltage values held by these two holding circuits.

The correction processing section 40 performs correction processing for correcting, out of the respective frame data output from the signal readout section 20, voltage values V(1, n1) to V(m0, n1) corresponding to the m0 pixel units $P_{1,n1}$ to $P_{m0,n1}$ of the n1-th column being a neighboring line according to the following equation (2) (equations (2a), (2b)), and determines corrected voltage values $V_c(1, n1)$ to $V_c(m0, n1)$ of these voltage values.

[Equation 2]

$$Y = \sum_{m=1}^{m0} (V(m, n1) - V(m, n2))/m0 \quad (2a)$$

$$V_c(m, n1) = V(m, n1) - KY \quad (m = 1 \sim m0) \quad (2b)$$

The coefficient K to be used in this correction processing indicates the degree of influence that generation of charge in the photodiode of each of the m0 pixel units $P_{1,n0}$ to $P_{m0,n0}$ of the n0-th column being a defective line has on m0 pixel units $P_{1,n1}$ to $P_{m0,n1}$ of the n1-th column being a neighboring line. Preferably, the coefficient K is determined based on voltage values V(1, n1) to V(m0, n1) and V(1, n2) to V(m0, n2) obtained when light is selectively made incident in a partial row range of the first row to the m0-th row in the n0-th column, the n1-th column, and the n2-th column and voltage values V(1, n1) to V(m0, n1) and V(1, n2) to V(m0, n2) obtained when light is selectively made incident in another partial row range of the first row to the m0-th row in the n0-th column, the n1-th column, and the n2-th column. How to determine the coefficient K will be described later in detail.

The correction processing section 40 preferably performs correction processing for neighboring columns on both sides of the n0-th column readout wiring line $L_{O,n0}$ being a defective line. Moreover, the correction processing section 40 preferably performs, when any multiple readout wiring lines of the readout wiring lines $L_{O,1}$ to $L_{O,N}$ are disconnected, by use of the coefficient K corresponding to each of the disconnected readout wiring lines, correction processing and determination processing for each of the readout wiring lines being defective lines.

Further, the correction processing section 40 performs determination processing for determining, based on the corrected voltage values $V_c(1, n1)$ to $V_c(m0, n1)$ corresponding to the m0 pixel units $P_{1,n1}$ to $P_{m0,n1}$ of the n1-th column being a neighboring line obtained in the above correction processing, voltage values V(1, n0) to V(m0, n0) corresponding to the m0 pixel units $P_{1,n0}$ to $P_{m0,n0}$ of the n0-th column being a defective line. In this case of determination processing, it is preferable to make determination by an interpolation calculation based on corrected voltage values corresponding to pixel units on neighboring lines on both sides.

Then, the correction processing section 40 outputs frame data for which a voltage value corresponding to each of the pixel units $P_{m,n1}$ of the n1-th column being a neighboring line and the pixel units $P_{m,n0}$ of the n0-th column being a defective line has been corrected and determined as in the above.

Figure 5:
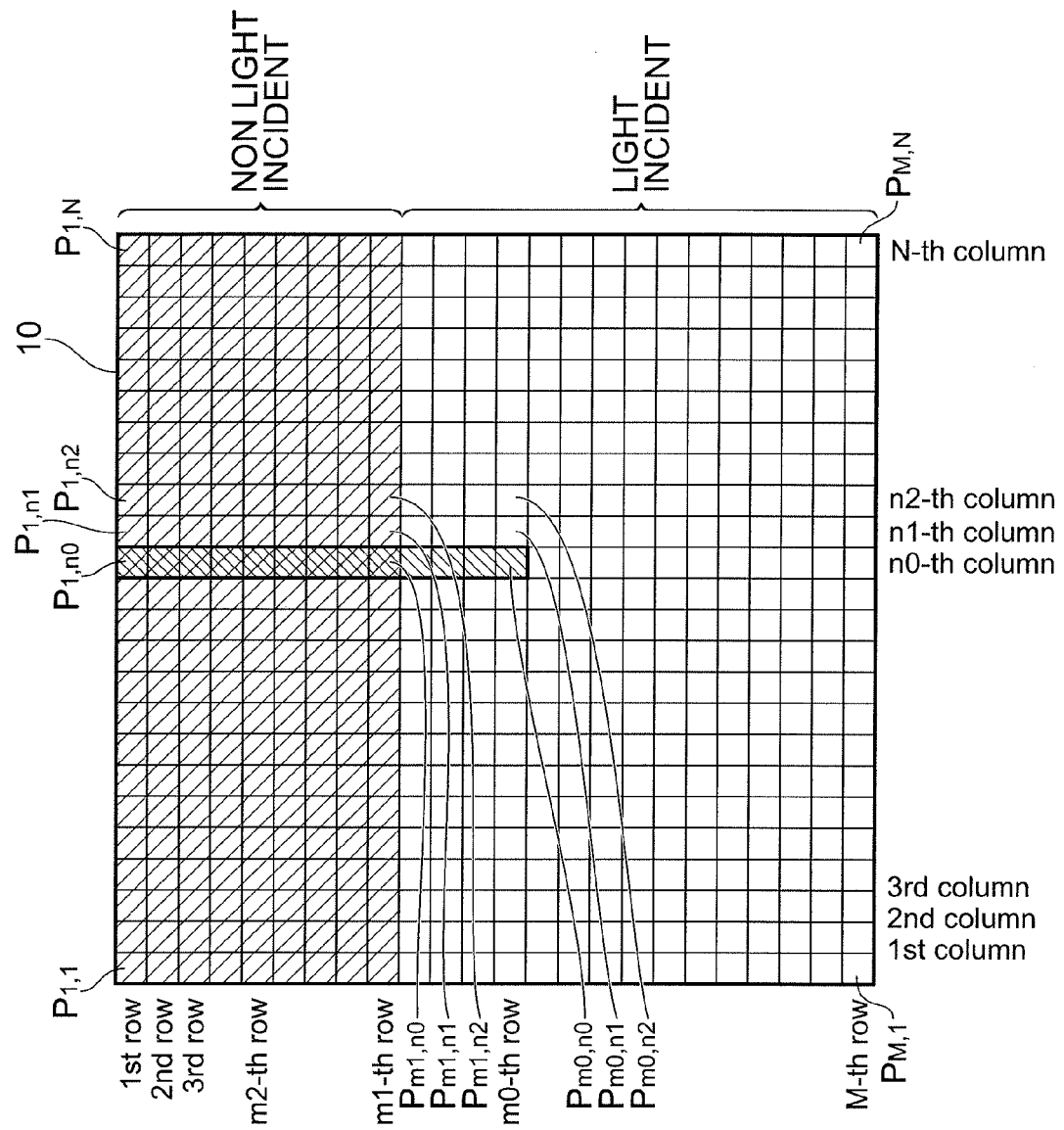
FIG. 5 is a diagram showing an arrangement of respective pixel units $P_{m,n}$ in the photodetecting section 10 of the solid-state image pickup device 1 according to the present embodiment, and showing a row range where light is selectively made incident.
Figure 6:
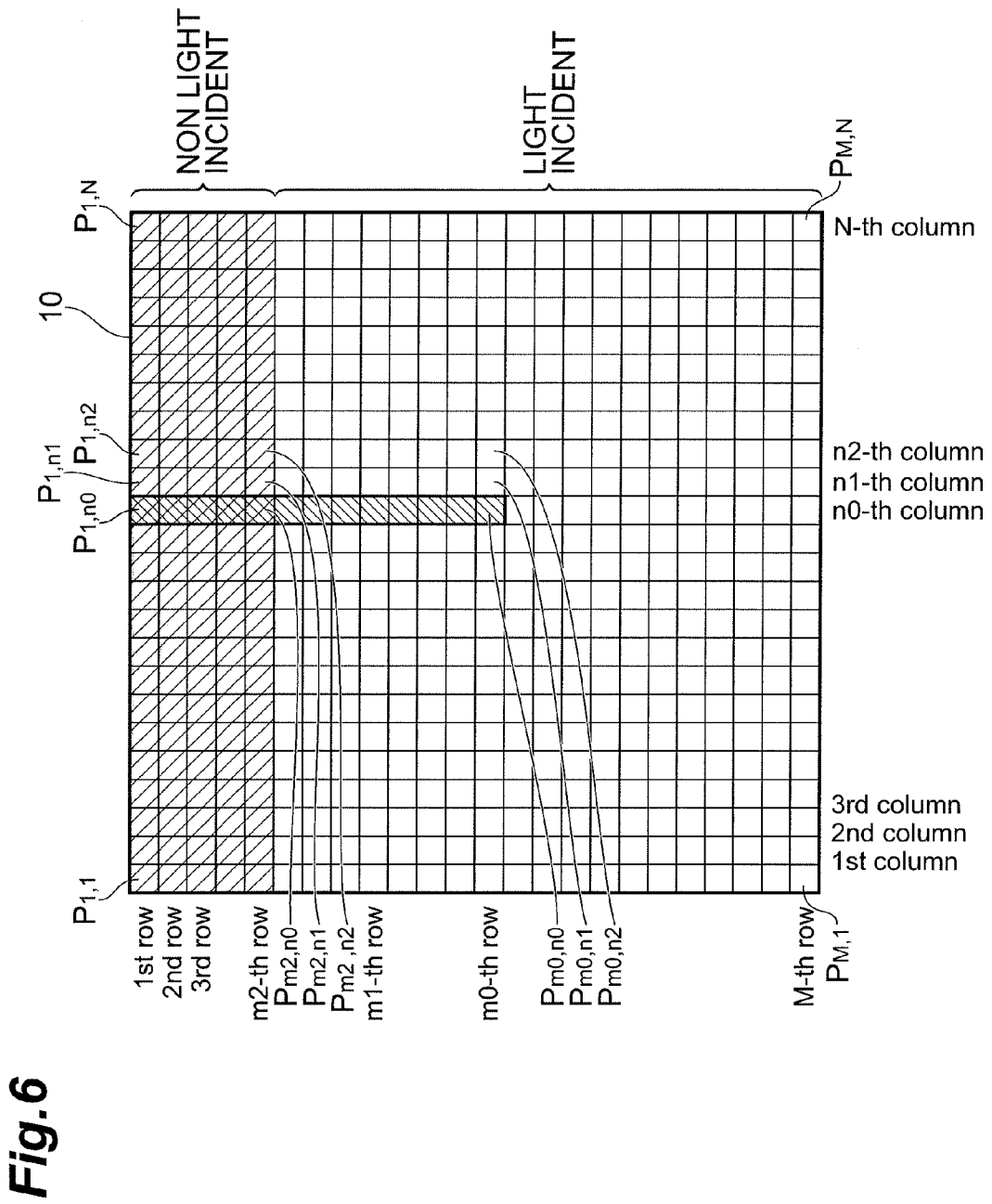
FIG. 6 is a diagram showing an arrangement of respective pixel units $P_{m,n}$ in the photodetecting section 10 of the solid-state image pickup device 1 according to the present embodiment, and showing a row range where light is selectively made incident.

Next, an example of how to determine the coefficient K to be used in the correction processing section 40 will be explained by using FIG. 5 to FIG. 7. FIG. 5 and FIG. 6 are diagrams each showing an arrangement of respective pixel units $P_{m,n}$ in the photodetecting section 10 of the solid-state image pickup device 1 according to the present embodiment, and also showing a row range where light is selectively made incident. In FIG. 5, shown is a state where a row range (hatched region) from the first row to the m1-th row of the photodetecting section 10 is shielded from light and light is not made incident therein, and a uniform intensity of light is made incident in a row range from the (m1+1)-th row to the M-th row. In FIG. 6, shown is a state where a row range (hatched region) from the first row to the m2-th row of the photodetecting section 10 is shielded from light and light is not made incident therein, and a uniform intensity of light is made incident in a row range from the (m2+1)-th row to the M-th row. Here, m1 and m2 are less than m0, and are mutually different values.

A voltage value corresponding to the pixel unit $P_{m,n}$ is expressed as $V_1(m,n)$ in the case of FIG. 5, and a calculation of the following equation (3) (equations (3a) to (3c)) is performed to determine $X_1$, $Y_{1A}$, and $Y_{1B}$. "$V_1(m,n1)-V_1(m,n2)$" on the right side of this equation indicates an increment $\Delta V_1(m,n1)$ due to the influence that generation of charge in the photodiode of each of the m0 pixel units $P_{1,n0}$ to $P_{m0,n0}$ of the n0-th column being a defective line (in actuality, (m0−m1) pixel units $P_{m1+1,n0}$ to $P_{m0,n0}$ being in a light incident row range) has on the pixel unit $P_{m,n1}$ of the n1-th column being a neighboring line. $X_1$ is a value of the increment $\Delta V_1(m,n1)$ averaged in a range from the first row to the m0-th row. $Y_{1A}$ is a value of the increment $\Delta V_1(m,n1)$ averaged in a non light incident row range from the first row to the m1-th row. Moreover, $Y_{1B}$ is a value of the increment $\Delta V_1(m,n1)$ averaged in a light incident row range from the (m1+1)-th row to the m0-th row.

[Equation 3]

$$X_1 = \sum_{m=1}^{m0} (V_1(m, n1) - V_1(m, n2))/m0 \quad (3a)$$

$$Y_{1A} = \sum_{m=1}^{m1} (V_1(m, n1) - V_1(m, n2))/m1 \quad (3b)$$

$$Y_{1B} = \sum_{m=m1+1}^{m0} (V_1(m, n1) - V_1(m, n2))/(m0 - m1) \quad (3c)$$

A voltage value corresponding to the pixel unit $P_{m,n}$ is expressed as $V_2(m,n)$ in the case of FIG. 6, and a calculation of the following equation (4) (equations (4a) to (4c)) is performed to determine $X_2$, $Y_{2A}$, and $Y_{2B}$. "$V_2(m,n1)-V_2(m,n2)$" on the right side of this equation indicates an increment $\Delta V_2(m,n1)$ due to the influence that generation of charge in the photodiode of each of the m0 pixel units $P_{1,n0}$ to $P_{m0,n0}$ of the n0-th column being a defective line (in actuality, (m0−m2)

pixel units $P_{m2+1,n0}$ to $P_{m0,n0}$ being in a light incident row range) has on the pixel unit $P_{m,n1}$ of the n1-th column being a neighboring line. $X_2$ is a value of the increment $\Delta V_2(m,n1)$ averaged in a range from the first row to the m0-th row. $Y_{2A}$ is a value of the increment $\Delta V_2(m,n1)$ averaged in a non light incident row range from the first row to the m2-th row. Moreover, $Y_{2B}$ is a value of the increment $\Delta V_2(m,n1)$ averaged in a light incident row range from the (m2+1)-th row to the m0-th row.

[Equation 4]

$$X_2 = \sum_{m=1}^{m0} (V_2(m, n1) - V_2(m, n2))/m0 \qquad (4a)$$

$$Y_{2A} = \sum_{m=1}^{m2} (V_2(m, n1) - V_2(m, n2))/m2 \qquad (4b)$$

$$Y_{2B} = \sum_{m=m2+1}^{m0} (V_2(m, n1) - V_2(m, n2))/(m0 - m2) \qquad (4c)$$

Figure 7:
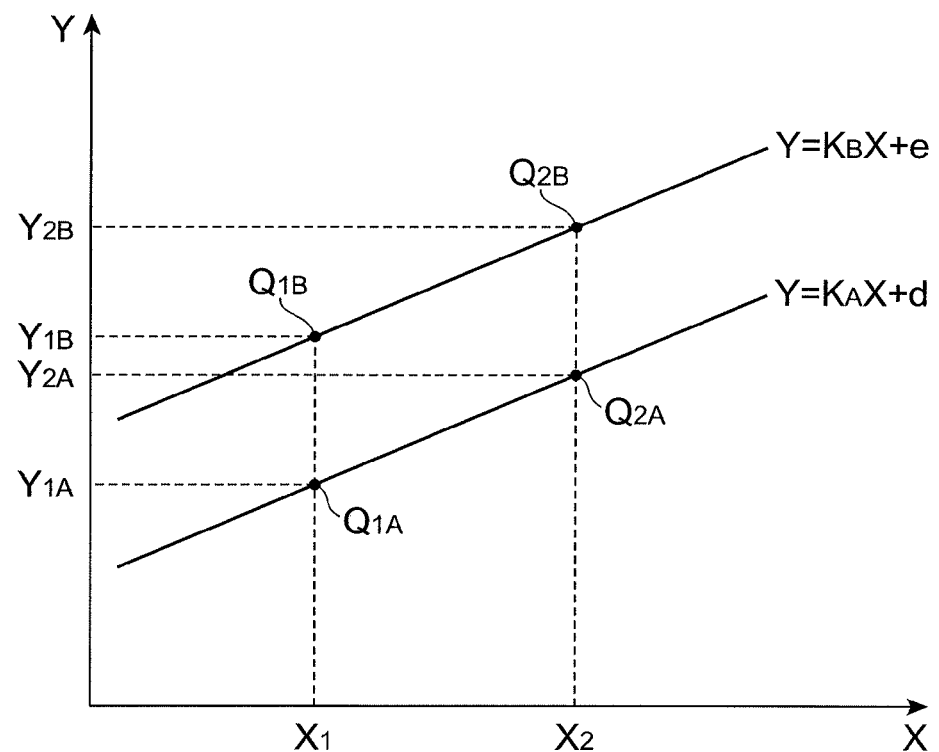
FIG. 7 is a diagram for explaining how to determine a coefficient K to be used in a correction processing section 40 of the solid-state image pickup device 1 according to the present embodiment.

FIG. 7 is a diagram for explaining how to determine a coefficient K to be used in the correction processing section 40 of the solid-state image pickup device 1 according to the present embodiment. As shown in this figure, a point $Q_{1A}$ ($X_1$, $Y_{1A}$) and a point $Q_{1B}$ ($X_1$, $Y_{1B}$) are plotted on an X-Y plane by use of $X_1$, $Y_{1A}$, and $Y_{1B}$ obtained in the case of FIG. 5, and a point $Q_{2A}$ ($X_2$, $Y_{2A}$) and a point $Q_{2B}$ ($X_2$, $Y_{2B}$) are plotted by use of $X_2$, $Y_{2A}$, and $Y_{2B}$ obtained in the case of FIG. 6. An equation (the following equation (5)) expressing a straight line connecting the point $Q_{1A}$ ($X_1$, $Y_{1A}$) and the point $Q_{2A}$($X_2$, $Y_{2A}$) is determined, and an equation (the following equation (6)) expressing a straight line connecting the point $Q_{1B}$ ($X_1$, $Y_{1B}$) and the point $Q_{2B}$ ($X_2$, $Y_{2B}$) is determined. Then, as an average value of a coefficient $K_A$ in the equation (5) and a coefficient $K_B$ in the equation (6), a coefficient K to be used in the correction processing section 40 is determined by the following equation (7).

[Equation 5]

$$Y=K_A X+d \qquad (5)$$

[Equation 6]

$$Y=K_B X+e \qquad (6)$$

[Equation 7]

$$K=(K_A+K_B)/2 \qquad (7)$$

The coefficient K (or $K_A$, $K_B$) to be thus determined indicates an average value of ratios of increments ($Y_{2A}-Y_{1A}$, or $Y_{2B}-Y_{1B}$) of voltage values V(1, n1) to V(m0, n1) corresponding to the m0 pixel units $P_{1,n1}$ to $P_{m0,n1}$ of the n1-th column being a neighboring line to increments ($X_2-X_1$) in the amount of charge generated in the photodiode of each of the m0 pixel units $P_{1,n0}$ to $P_{m0,n0}$ of the n0-th column being a defective line. That is, the coefficient K (or $K_A$, $K_B$) indicates the degree of influence that generation of charge in the photodiode of each of the m0 pixel units $P_{1,n0}$ to $P_{m0,n0}$ of the n0-th column being a defective line has on m0 pixel units $P_{1,n1}$ to $P_{m0,n1}$ of the n1-th column being a neighboring line.

In addition, the validity of performing correction processing by use of the coefficient K that reflects such an average value as in the above is as follows. That is, the m0 pixel units $P_{1,n0}$ to $P_{m0,n0}$ of the n0-th column being a defective line are not connected to the signal readout section 20 due to a disconnection of the n0-th column readout wiring line $L_{O,n0}$, but are mutually connected by the n0-th column readout wiring line $L_{O,n0}$. Therefore, charges generated in the photodiodes of the respective m0 pixel units $P_{1,n0}$ to $P_{m0,n0}$ of the n0-th column being a defective line, being in a shared manner among these, have the same degree of influence on each of the m0 pixel units $P_{1,n1}$ to $P_{m0,n1}$ of the n1-th column being a neighboring line. Because of this, correction processing for the voltage values V(1, n1) to V(m0, n1) corresponding to the m0 pixel units $P_{1,n1}$ to $P_{m0,n1}$ of the n1-th column being a neighboring line can be performed by the above equation (2) by use of the coefficient K as in the above.

As in the above, the non light incident row range and light incident row range are set in two patterns within the range from the first row to the m0-th row of the photodetecting section 10 (FIG. 5, FIG. 6), and in each case of the two patterns, voltage values V(1, n1) to V(m0, n1) corresponding to the m0 pixel units $P_{1,n2}$ to $P_{m0,n1}$ of the n1-th column of a neighboring line are obtained, and voltage values V(1, n2) to V(m0, n2) corresponding to the m0 pixel units $P_{1,n2}$ to $P_{m0,n2}$ of the n2-th column of a normal line are obtained. Next, $X_1$, $Y_{1A}$, and $Y_{1B}$ are determined by the above equation (3), $X_2$, $Y_{2A}$, and $Y_{2B}$ are determined by the above equation (4), and a point $Q_{1A}$ ($X_1$, $Y_{1A}$), a point $Q_{1B}$ ($X_1$, $Y_{1B}$), a point $Q_{2A}$ ($X_2$, $Y_{2A}$), and a point $Q_{2B}$ ($X_2$, $Y_{2B}$) are plotted on an X-Y plane (FIG. 7). Then, a coefficient $K_A$ of a straight line (the above equation (5)) connecting the point $Q_{1A}$ ($X_1$, $Y_{1A}$) and the point $Q_{2A}$ ($X_2$, $Y_{2A}$) is determined, a coefficient $K_B$ of a straight line (the above equation (6)) connecting the point $Q_{1B}$ ($X_1$, $Y_{1B}$) and the point $Q_{2B}$ ($X_2$, $Y_{2B}$) is determined, and a coefficient K (the above equation (7)) is determined as an average value of the coefficient $K_A$ and the coefficient $K_B$.

In the above explanation using FIG. 5 to FIG. 7, the non light incident row range and light incident row range are set in two patterns within the range from the first row to the m0-th row in the photodetecting section 10, but three patterns or more of the non light incident row range and light incident row range may be set. In the latter case, the above equation (5) and equation (6) can be determined as equations of straight lines to be obtained by the method of least squares based on three or more points on an X-Y plane. Thus, a coefficient K of a more accurate value can be obtained.

It is preferable that the correction processing section 40, when performing such a processing as in the above, apply in advance a dark correction to a voltage value corresponding to each pixel unit of the frame data output from the signal readout section 20. Moreover, the correction processing section 40 may apply such a processing as in the above by an analog processing, but preferably applies a digital processing after digital conversion of the frame data output from the signal readout section 20, and preferably includes a frame memory that stores frame data as digital values.

It is preferable that the correction processing section 40, in order to perform such a processing as in the above, includes a storage section that stores in advance a disconnected readout wiring line out of the readout wiring lines $L_{O,1}$ to $L_{O,N}$ and the position of disconnection in the disconnected readout wiring line. Further, it is preferable that disconnection information obtained in the middle of manufacturing of the solid-state image pickup device 1 or in an inspection after manufacturing can be externally stored in the storage section mentioned above.

Moreover, the correction processing section 40 may be provided integrally with the photodetecting section 10, the signal readout section 20, and the controlling section 30. In this case, it is preferable that the solid-state image pickup device 1 as a whole is integrated on a semiconductor substrate. Alternatively, the photodetecting section 10, the signal readout section 20, and the controlling section 30 are integrated, while the correction processing section 40 may be provided separately of these. In this case, the correction processing section 40 can be realized by, for example, a computer.

As has been described above, in the solid-state image pickup device 1 according to the present embodiment or the method for correcting frame data output from the signal readout section 20 of the solid-state image pickup device 1, when correcting the voltage values V(1, n1) to V(m0, n1) corresponding to the m0 pixel units $P_{1,n1}$ to $P_{m0,n1}$ of the n1-th column being a neighboring line, the correction can be performed by a simple arithmetic expression (the above equation (2)) by use of the voltage values V(1, n2) to V(m0, n2) corresponding to the m0 pixel units $P_{1,n2}$ to $P_{m0,n2}$ of the n2-th column being a normal line and the coefficient K.

In addition, an outputting operation of frame data by the signal readout section 20 and a correction processing by the correction processing section 40 may be alternately performed, or may be performed in parallel. In the former case, after an outputting operation of frame data by the signal readout section 20, a correction processing of frame data by the correction processing section 40 is applied, and after the correction processing ends, next frame data is output to the correction processing section 40 from the signal readout section 20. On the other hand, in the latter case, after an outputting operation of frame data by the signal readout section 20, a correction processing of frame data by the correction processing section 40 is applied, and in a period at least partially overlapping a period of the correction processing, next frame data is output to the correction processing section 40 from the signal readout section 20.

Moreover, leakage of charge from a pixel unit on a defective line into a pixel unit on a neighboring line occurs for pixel units on neighboring lines on both sides of the defective line. Therefore, it is preferable to apply, to the pixel units on the neighboring lines on both sides of the defective line, a correction using voltage values of previous frame data. However, when binning (adding) and reading out voltage values of pixel units on a neighboring line neighboring a defective line on one side and voltage values of pixel units on a normal line further neighboring on the same side, only to the voltage values of pixel units on a neighboring line neighboring the defective line on the other side, a correction using voltage values of previous frame data is applied. In this case, a higher resolution can be obtained than that by the invention described in Patent Document 1.

The solid-state image pickup device 1 according to the present embodiment, or the method for correcting frame data output from the signal readout section 20 of the solid-state image pickup device 1 can be suitably used in an X-ray CT apparatus. Therefore, an embodiment of an X-ray CT apparatus including the solid-state image pickup device 1 according to the present embodiment will be described in the following.

Figure 8:
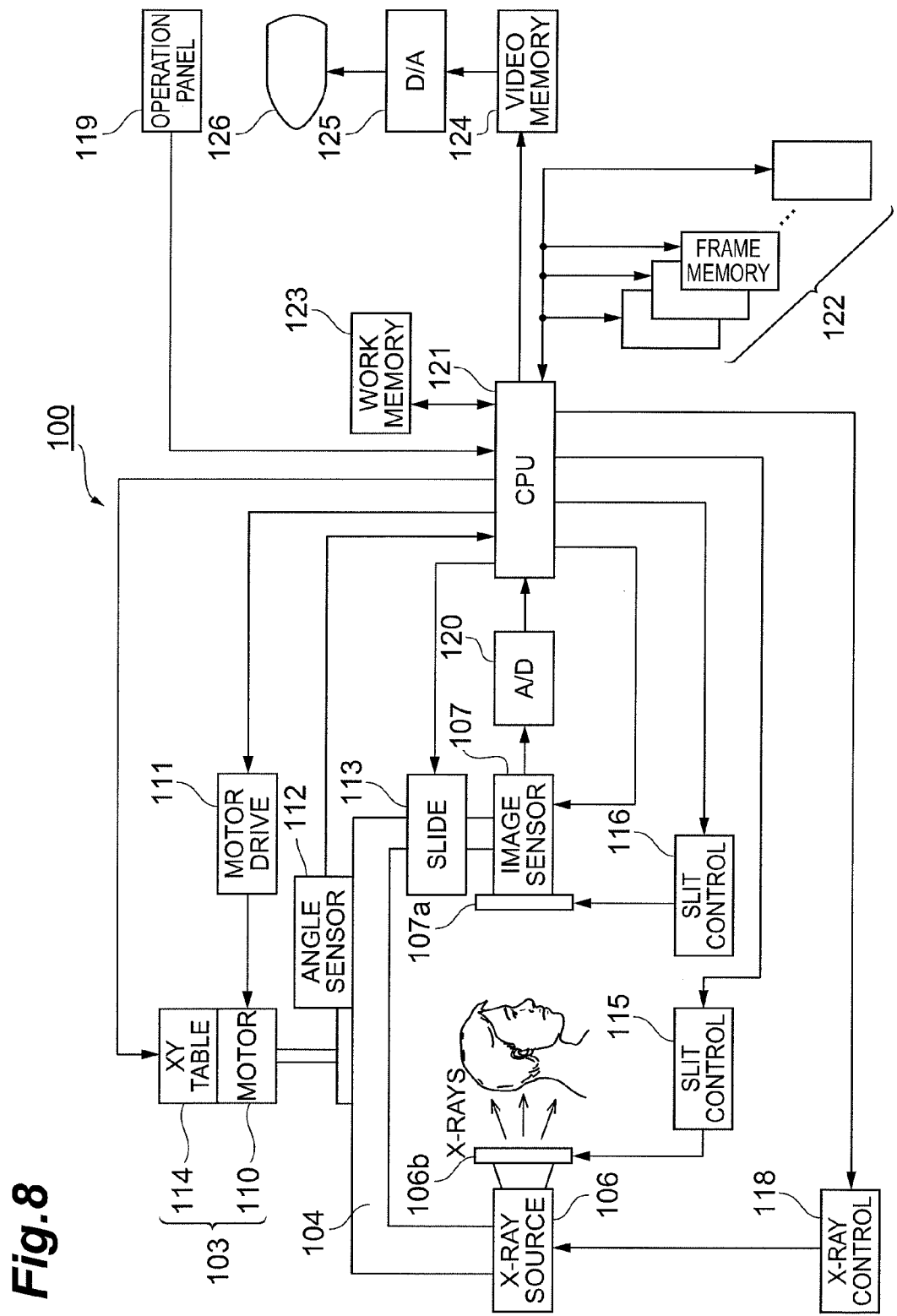
FIG. 8 is a configuration diagram of an X-ray CT apparatus 100 according to the present embodiment.

FIG. 8 is a configuration diagram of an X-ray CT apparatus 100 according to the present embodiment. In the X-ray CT apparatus 100 shown in this figure, an X-ray source 106 generates X-rays toward a subject. The radiation field of X-rays generated from the X-ray source 106 is controlled by a primary slit plate 106b. The X-ray source 106 has a built-in X-ray tube, and by adjusting conditions of the X-ray tube, such as a tube voltage, a tube current, and energization time, the X-ray dose to the subject is controlled. An X-ray image sensor 107 has a built-in CMOS solid-state image pickup device having a plurality of pixel units arrayed two-dimensionally, and detects an X-ray image transmitted through the subject. In front of the X-ray image sensor 107, a secondary slit plate 107a that limits an X-ray incident region is provided.

A swing arm 104 holds the X-ray source 106 and the X-ray image sensor 107 so as to be opposed, and swings these around the subject in panoramic tomography. Moreover, in the case of linear tomography, a slide mechanism 113 for linearly displacing the X-ray image sensor 107 with respect to the subject is provided. The swing arm 104 is driven by an arm motor 110 that forms a rotary table, and a rotation angle thereof is detected by an angle sensor 112. Moreover, the arm motor 110 is mounted on a movable portion of an XY table 114, and the center of rotation is arbitrarily adjusted in a horizontal plane.

Image signals output from the X-ray image sensor 107 are converted to, for example, 10-bit (=1024 level) digital data by an AD converter 120, once taken in a CPU (central processing unit) 121, and then stored in a frame memory 122. From the image data stored in the frame memory 122, a tomographic image along any tomographic plane is reproduced by a predetermined arithmetic processing. The reproduced tomographic image is output to a video memory 124, converted to analog signals by a DA converter 125, and then displayed by an image display section 126 such as a CRT (cathode ray tube), and provided for various diagnoses.

The CPU 121 is connected with a work memory 123 required for signal processing, and further connected with an operation panel 119 having a panel switch, an X-ray irradiation switch, etc. Moreover, the CPU 121 is connected to a motor drive circuit 111 that drives the arm motor 110, slit control circuits 115, 116 that control the opening range of the primary slit plate 106b and the secondary slit plate 107a, an X-ray control circuit 118 that controls the X-ray source 106, respectively, and further outputs a clock signal to drive the X-ray image sensor 107.

The X-ray control circuit 118 is capable of feedback-controlling the X-ray dose to the subject based on signals imaged by the X-ray image sensor 107.

In the X-ray CT apparatus 100 configured as above, the X-ray image sensor 107 corresponds to the photodetecting section 10, the signal readout section 20, and the controlling section 30 of the solid-state image pickup device 1 according to the present embodiment, and a scintillator panel is provided at the front of the photodetecting section 10. Moreover, the CPU 121 and the work memory 123 correspond to the correction processing section 40 of the solid-state image pickup device 1 according to the present embodiment.

As a result of including the solid-state image pickup device 1 according to the above embodiment, and including the CPU 121 as an image analyzing section that generates a tomographic image of a subject based on frame data applied with correction processing output from the solid-state image pickup device, the X-ray CT apparatus 100 can acquire a tomographic image having a high resolution in the vicinity of a defective line. In particular, in the X-ray CT apparatus, a large number of (for example, 300) frames of data are successively obtained in a short period, and the amount of incident light into the photodetecting section 10 of the solid-state image pickup device 1 varies frame by frame, and therefore, the amount of charges overflowing from pixel units on a defective line to pixel units on neighboring lines varies frame by frame. As a result of including the solid-state image pickup device 1 according to the present embodiment in such an X-ray CT apparatus, an effective correction can be applied to frame data.

Here, in the solid-state image pickup device according to the above-described embodiment, used is a configuration including (1) a photodetecting section where M×N pixel units $P_{1,1}$ to $P_{M,N}$ each including a photodiode that generates charge of an amount according to an incident light intensity and a readout switch connected with the photodiode are two-dimensionally arrayed in M rows and N columns, (2) a readout wiring line $L_{O,n}$ connected to the readout switch of each of the M pixel units $P_{1,n}$ to $P_{M,n}$ of an n-th column in the photodetecting section, for reading out a charge generated in the photodiode of any pixel unit of the M pixel units $P_{1,n}$ to $P_{m,n}$ via the readout switch of the pixel unit, (3) a signal readout section connected to each of the readout wiring lines $L_{O,1}$ to $L_{O,N}$, for holding a voltage value according to an amount of charge input through the readout wiring line $L_{O,n}$, and sequentially outputting the held voltage values, and (4) a controlling section that controls an opening and closing operation of the readout switch of each of the N pixel units $P_{m,1}$ to $P_{m,N}$ of an m-th row in the photodetecting section and controls an outputting operation of a voltage value in the signal readout section to make a voltage value V(m,n) according to an amount of charge generated in the photodiode of each pixel unit $P_{m,n}$ in the photodetecting section be output as frame data from the signal readout section. Here, M and N are each an integer not less than 2, m is an integer not less than 1 and not more than M, and n is an integer not less than 1 and not more than N.

The solid-state image pickup device according to the above-described embodiment further includes a correction processing section that acquires respective frame data output from the signal readout section to apply thereto correction processing, in addition to the above-described photodetecting section, readout wiring line $L_{O,n}$, signal readout section, and controlling section. Moreover, a frame data correcting method according to the above-described embodiment is a method for correcting frame data output from a solid-state image pickup device including the above-described photodetecting section, readout wiring line $L_{O,n}$, signal readout section, and controlling section.

In the correction processing section included in the solid-state image pickup device according to the above-described embodiment or the frame data correcting method, used is a configuration of, when m0 pixel units $P_{1,n0}$ to $P_{m0,n0}$ of any n0-th column are not connected to the signal readout section due to a disconnection of the n0-th column readout wiring line $L_{O,n0}$ of the readout wiring lines $L_{O,1}$ to $L_{O,N}$, by use of a coefficient K indicating the degree of influence that generation of charge in the photodiode of each of the m0 pixel units $P_{1,n0}$ to $P_{m0,n0}$ of the n0-th column has on m0 pixel units $P_{1,n1}$ to $P_{m0,n1}$ of an n1-th column neighboring the n0-th column, performing correction processing for correcting, out of the respective frame data output from the signal readout section, voltage values V(1, n1) to V(m0, n1) corresponding to the m0 pixel units $P_{1,n1}$ to $P_{m0,n1}$ of the n1-th column according to the above equation (1), and performing determination processing for determining, based on corrected voltage values $V_c(1, n1)$ to $V_c(m0, n1)$ of these voltage values, voltage values $V_c(1, n0)$ to V(m0, n0) corresponding to the m0 pixel units $P_{1,n0}$ to $P_{m0,n0}$ of the n0-th column. Here, m0 is an integer not less than 1 and not more than M, and n0, n1, and n2 are each an integer not less than 1 and not more than N.

It is preferable that the correction processing section included in the solid-state image pickup device according to the above-described configuration or the frame data correcting method according to the above-described configuration uses, as the coefficient K, a value determined based on voltage values V(1, n1) to V(m0, n1) and V(1, n2) to V(m0, n2) obtained when light is selectively made incident in a partial row range from the first row to the m0-th row of the n0-th column, the n1-th column, and the n2-th column and voltage values V(1, n1) to V(m0, n1) and V(1, n2) to V(m0, n2) obtained when light is selectively made incident in another partial row range from the first row to the m0-th row of the n0-th column, the n1-th column, and the n2-th column, taking a column not being either the n0-th column or the n1-th column as an n2-th column. Here, n2 is an integer not less than 1 and not more than N.

It is preferable that the correction processing section included in the solid-state image pickup device according to the above-described configuration or the frame data correcting method according to the above-described configuration performs the correction processing for neighboring columns on both sides of the disconnected n0-th column readout wiring line $L_{O,n0}$.

It is preferable that, when any multiple readout wiring lines of the readout wiring lines $L_{O,1}$ to $L_{O,N}$ are disconnected, by use of the coefficient K corresponding to each of the disconnected readout wiring lines, the correction processing section included in the solid-state image pickup device according to the above-described configuration or the frame data correcting method according to the above-described configuration performs the correction processing and the determination processing for each of the disconnected readout wiring lines.

Moreover, in an X-ray CT apparatus according to the above-described embodiment, used is a configuration including (1) an X-ray output section that outputs X-rays toward a subject, (2) the solid-state image pickup device according to the above-described configuration that receives and images X-rays having been output from the X-ray output section and reached through the subject, (3) a moving unit that moves the X-ray output section and the solid-state image pickup device relative to the subject, and (4) an image analyzing section that is input with frame data applied with the correction processing output from the solid-state image pickup device, and generates a tomographic image of the subject based on the frame data.

INDUSTRIAL APPLICABILITY

The present invention can be used as a solid-state image pickup device that can acquire a high-resolution image by correcting pixel data when any readout wiring line is disconnected.

REFERENCE SIGNS LIST

1—solid-state image pickup device, 10—photodetecting section, 20—signal readout section, 30—controlling section, 40—correction processing section, $P_{1,1}$ to $P_{M,N}$—pixel unit, PD—photodiode, $SW_1$—readout switch, $S_1$ to $S_N$—integration circuit, $C_2$—integrating capacitive element, $SW_2$—discharge switch, $A_2$—amplifier, $H_1$ to $H_N$—holding circuit, $C_3$—holding capacitive element, $SW_{31}$—input switch, $SW_{32}$—output switch, $L_{V,m}$—m-th row selection wiring line, $L_{H,n}$—n-th column selection wiring line, $L_{O,n}$—n-th column readout wiring line, $L_R$—discharge wiring line, $L_H$—hold wiring line, $L_{out}$—voltage output wiring line.

The invention claimed is:
1. A solid-state image pickup device comprising:
a photodetecting section where M×N pixel units $P_{1,1}$ to $P_{M,N}$ each including a photodiode that generates charge of an amount according to an incident light intensity and a readout switch connected with the photodiode are two-dimensionally arrayed in M rows and N columns;

a readout wiring line $L_{O,n}$ connected to the readout switch of each of the M pixel units $P_{1,n}$ to $P_{M,n}$ of an n-th column in the photodetecting section, for reading out a charge generated in the photodiode of any pixel unit of the M pixel units $P_{1,n}$ to $P_{M,n}$ via the readout switch of the pixel unit;

a signal readout section connected to each of the readout wiring lines $L_{O,1}$ to $L_{O,N}$, for holding a voltage value according to an amount of charge input through the readout wiring line $L_{O,n}$ and sequentially outputting the held voltage values;

a controlling section that controls an opening and closing operation of the readout switch of each of the N pixel units $P_{m,1}$ to $P_{m,N}$ of an m-th row in the photodetecting section and controls an outputting operation of a voltage value in the signal readout section to make a voltage value V(m,n) according to an amount of charge generated in the photodiode of each pixel unit $P_{m,n}$ in the photodetecting section be output as frame data from the signal readout section; and a correction processing section that acquires respective frame data output from the signal readout section to apply thereto correction processing, wherein the correction processing section, when m0 pixel units $P_{1,n0}$ to $P_{m0,n0}$ of any n0-th column are not connected to the signal readout section due to a disconnection of the n0-th column readout wiring line $L_{O,n0}$ of the readout wiring lines $L_{O,1}$ to $L_{O,N}$, by use of a coefficient K indicating the degree of influence that generation of charge in the photodiode of each of the m0 pixel units $P_{1,n0}$ to $P_{m0,n0}$ of the n0-th column has on m0 pixel units $P_{1,n1}$ to $P_{m0,n1}$ of an n1-th column neighboring the n0-th column, performs correction processing for correcting, out of the respective frame data output from the signal readout section, voltage values V(1, n1) to V(m0, n1) corresponding to the m0 pixel units $P_{1,n1}$ to $P_{m0,n1}$ of the n1-th column according to the following equation (1), taking a column not being either the n0-th column or the n1-th column as an n2-th column, and performs determination processing for determining, based on corrected voltage values $V_c(1, n1)$ to $V_c(m0, n1)$ of these voltage values, voltage values V(1, n0) to V(m0, n0) corresponding to the m0 pixel units $P_{1,n0}$ to $P_{m0,n0}$ of the n0-th column (provided that M and N are each an integer not less than 2, m is an integer not less than 1 and not more than M, n is an integer not less than 1 and not more than N, m0 is an integer not less than 1 and not more than M, and n0, n1, and n2 are each an integer not less than 1 and not more than N)

[Equation 1]

$$Y = \sum_{m=1}^{m0} (V(m, n1) - V(m, n2))/m0 \quad (1a)$$

$$V_c(m, n1) = V(m, n1) - KY \quad (m = 1 \sim m0). \quad (1b)$$

2. The solid-state image pickup device according to claim 1, wherein the correction processing section uses, as the coefficient K, a value determined based on voltage values V(1, n1) to V(m0, n1) and V(1, n2) to V(m0, n2) obtained when light is selectively made incident in a partial row range of the first row to the m0-th row in the n0-th column, the n1-th column, and the n2-th column and voltage values V(1, n1) to V(m0, n1) and V(1, n2) to V(m0, n2) obtained when light is selectively made incident in another partial row range of the first row to the m0-th row in the n0-th column, the n1-th column, and the n2-th column.

3. The solid-state image pickup device according to claim 1, wherein the correction processing section performs the correction processing for neighboring columns on both sides of the disconnected n0-th column readout wiring line $L_{O,n0}$.

4. The solid-state image pickup device according to claim 1, wherein when any multiple readout wiring lines of the readout wiring lines $L_{O,1}$ to $L_{O,N}$ are disconnected, by use of the coefficient K corresponding to each of the disconnected readout wiring lines, the correction processing section performs the correction processing and the determination processing for each of the disconnected readout wiring lines.

5. An X-ray CT apparatus comprising:

an X-ray output section that outputs X-rays toward a subject;

the solid-state image pickup device according to claim 1 that receives and images X-rays having been output from the X-ray output section and reached through the subject;

a moving unit that moves the X-ray output section and the solid-state image pickup device relative to the subject; and an image analyzing section that is input with frame data after the correction processing output from the solid-state image pickup device, and generates a tomographic image of the subject based on the frame data.

6. A method for correcting frame data output from a solid-state image pickup device comprising:

a photodetecting section where M×N pixel units $P_{1,1}$ to $P_{M,N}$ each including a photodiode that generates charge of an amount according to an incident light intensity and a readout switch connected with the photodiode are two-dimensionally arrayed in M rows and N columns;

a readout wiring line $L_{O,n}$ connected to the readout switch of each of the M pixel units $P_{1,n}$ to $P_{M,n}$ of an n-th column in the photodetecting section, for reading out a charge generated in the photodiode of any pixel unit of the M pixel units $P_{1,n}$ to $P_{M,n}$ via the readout switch of the pixel unit;

a signal readout section connected to each of the readout wiring lines $L_{O,1}$ to $L_{O,N}$, for holding a voltage value according to an amount of charge input through the readout wiring line $L_{O,n}$ and sequentially outputting the held voltage values; and a controlling section that controls an opening and closing operation of the readout switch of each of the N pixel units $P_{m,1}$ to $P_{m,N}$ of an m-th row in the photodetecting section and controls an outputting operation of a voltage value in the signal readout section to make a voltage value V(m,n) according to an amount of charge generated in the photodiode of each pixel unit $P_{m,n}$ in the photodetecting section be output as frame data from the signal readout section, wherein the frame data correcting method comprises, when m0 pixel units $P_{1,n0}$ to $P_{m0,n0}$ of any n0-th column are not connected to the signal readout section due to a disconnection of the n0-th column readout wiring line $L_{O,n0}$ of the readout wiring lines $L_{O,1}$ to $L_{O,N}$, by use of a coefficient K indicating the degree of influence that generation of charge in the photodiode of each of the m0 pixel units $P_{1,n0}$ to $P_{m0,n0}$ of the n0-th column has on m0 pixel units $P_{1,n1}$ to $P_{m0,n1}$ of an n1-th column neighboring the n0-th column, performing correction processing for correcting, out of the respective frame data output from the signal readout section, voltage values V(1, n1) to V(m0, n1) corresponding to the m0 pixel units $P_{1,n1}$ to $P_{m0,n1}$ of the n1-th column according to the following equation (2), taking a column not being either the n0-th column or the n1-th column as an n2-th column, and performing determination processing for determining, based on corrected voltage values $V_c(1, n1)$ to $V(m0, n1)$ of these voltage values, voltage values $V(1, n0)$ to $V(m0, n0)$ corresponding to the m0 pixel units $P_{1,n0}$ to $P_{m0,n0}$ of the n0-th column (provided that M and N are each an integer not less than 2, m is an integer not less than 1 and not more than M, n is an integer not less than 1 and not more than N, m0 is an integer not less than 1 and not more than M, and n0, n1, and n2 are each an integer not less than 1 and not more than N)

[Equation 2]

$$Y = \sum_{m=1}^{m0} (V(m, n1) - V(m, n2))/m0 \quad (2a)$$

$$V_c(m, n1) = V(m, n1) - KY \quad (m = 1 \sim m0). \quad (2b)$$

7. The frame data correcting method according to claim 6, comprising using, as the coefficient K, a value that is determined based on voltage values $V(1, n1)$ to $V(m0, n1)$ and $V(1, n2)$ to $V(m0, n2)$ obtained when light is selectively made incident in a partial row range of the first row to the m0-th row in the n0-th column, the n1-th column, and the n2-th column and voltage values $V(1, n1)$ to $V(m0, n1)$ and $V(1, n2)$ to $V(m0, n2)$ obtained when light is selectively made incident in another partial row range of the first row to the m0-th row in the n0-th column, the n1-th column, and the n2-th column.

8. The frame data correcting method according to claim 6, comprising performing the correction processing for neighboring columns on both sides of the disconnected n0-th column readout wiring line $L_{O,n0}$.

9. The frame data correcting method according to claim 6, comprising performing, when any multiple readout wiring lines of the readout wiring lines $L_{O,1}$ to $L_{O,N}$ are disconnected, by use of the coefficient K corresponding to each of the disconnected readout wiring lines, the correction processing and the determination processing for each of the disconnected readout wiring lines.

* * * * *

UNITED STATES PATENT AND TRADEMARK OFFICE
CERTIFICATE OF CORRECTION

PATENT NO.       : 8,625,741 B2
APPLICATION NO. : 13/054298
DATED            : January 7, 2014
INVENTOR(S)      : Kyushima et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 406 days.

Signed and Sealed this
Twenty-second Day of September, 2015

Michelle K. Lee
*Director of the United States Patent and Trademark Office*